United States Patent [19]

Murata

[11] Patent Number: 5,113,216
[45] Date of Patent: May 12, 1992

[54] CAMERA

[75] Inventor: Yoshitaka Murata, Kanagawa, Japan

[73] Assignee: Canon Kabushiki Kaisha, Tokyo, Japan

[21] Appl. No.: 556,956

[22] Filed: Jul. 23, 1990

[30] Foreign Application Priority Data

Jul. 27, 1989 [JP] Japan .................................. 1-194611

[51] Int. Cl.[5] ............................................. G03B 15/05
[52] U.S. Cl. ................................... 354/421; 354/422; 354/137
[58] Field of Search ............... 354/436, 437, 421, 420, 354/422, 423, 195.1, 195.11, 137

[56]  References Cited

U.S. PATENT DOCUMENTS 4,354,748 10/1982 Grimes et al. ...................... 354/423

Primary Examiner—W. B. Perkey
Attorney, Agent, or Firm—Robin, Blecker, Daley & Driscoll

[57] ABSTRACT

A camera comprising a semi-open type shutter which also serves as a diaphragm, a flash device, a setting circuit for setting an aperture value for flash photography, and a control circuit for varying the opening speed of the shutter in accordance with the aperture value set by the setting circuit, whereby the previously set aperture value is established with high accuracy and reliability during the flash emission.

33 Claims, 7 Drawing Sheets

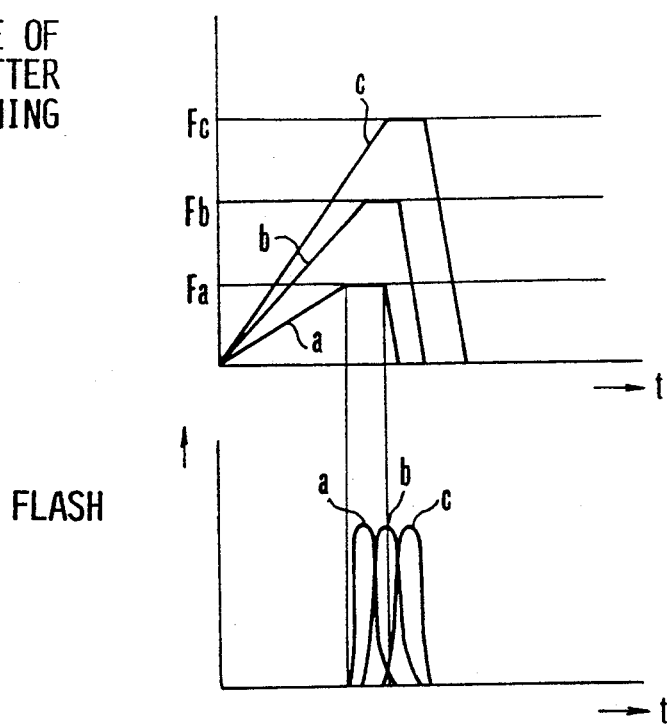
FIG. 5(a)
FIG. 5(b)
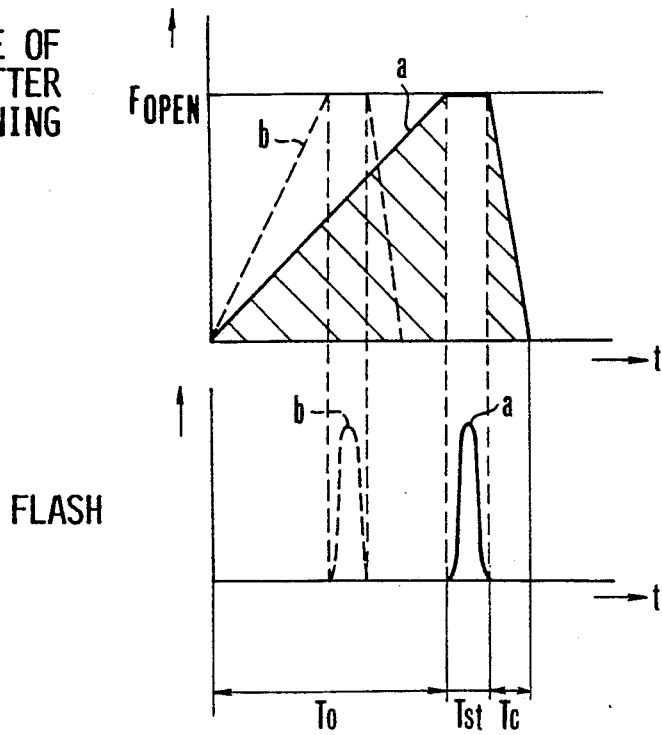
FIG. 6(a)
FIG. 6(b)

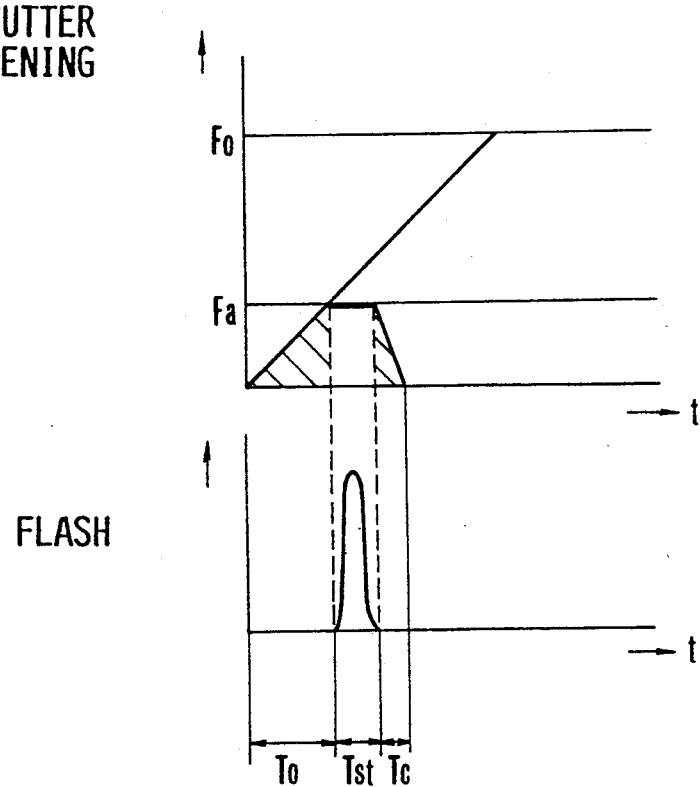
FIG. 7(a)
FIG. 7(b)
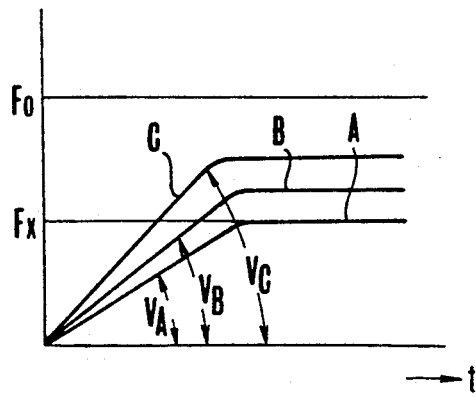
FIG. 8

CAMERA

BACKGROUND OF THE INVENTION

1. Field of the Invention

This invention relates to a flash photography control device and, more particularly, to cameras having the flash photography control device.

2. Description of the Related Art

The non-interchangeable lens type or so-called compact cameras have their shutters mostly formed to also serve as the diaphragm, or employ semi-open type shutters. Again, most of the publicly known compact cameras are equipped with the built-in flash device, or constructed in the form of flash device built-in type cameras. In many cases, this compact camera of the flash device built-in type, when operating in the flash exposure mode, automatically sets the size of aperture opening (shutter opening) to a value depending on the object distance which constitutes a parameter of the guide number, or employs what is called "a flashmatic device" as the diaphragm control device, or like flash control device.

With this compact camera having the flashmatic device, the flash exposure is controlled in such a way that as the semi-open type shutter is opening, when the size of the shutter opening has reached a predetermined value in F-number, flash light is emitted and, after the flash emission is finished, the shutter is closed. Such a flash control method by the flashmatic device is usable only when the flash light emitting time is very short as compared with the opening speed of the shutter. In application to a camera where the flash light emitting time is not sufficiently short as compared with the opening speed of the shutter, it becomes impossible to assure making of a correct exposure.

In more detail, in the case of the above-described compact camera, it takes 10-20 msec. for the shutter blades to run from the fully closed state to the fully open state. Since the flash light emitting time is several tens of microseconds, that is, the flash light emitting time is far shorter than the opening speed of the shutter, the shifted value of the aperture size (the size of opening of the shutter) falls certainly within the latitude of silver halide film. Hence, the deferral of the initiation of emission of flash light until the size of opening of the shutter reaches the predetermined F value can even make a predetermined exposure on the film. Thus, there is no possibility of occurrence of an insufficient exposure.

Meanwhile, in the recently commercialized electronic still camera, as the optical image input device use is made of a semiconductor such as a CCD (Charge-Coupled Device) which has a smaller latitude than that of silver halide film. It is, therefore, impossible to employ the above-described flashmatic method in controlling the flash exposure. Hence, in the electronic still camera, it has been the practice to adopt the external control type of flash device likewise as in the single-lens reflex camera. The external flash control method, as is well known, is that flash light is projected onto an object being photographed, the reflection of the light from the object is integrated and, when the integrated light reaches a predetermined value, the flash device is stopped from emitting flash light. With the use of this method, as the flash light emitting time differs depending on the reflectance of the object and the object distance, situations where the emitting time amounts to several milliseconds at maximum will be encountered. Therefore, if the flash emission occurs during the opening operation of the diaphragm (shutter) as in the flashmatic method, as it implies that the ratio of the emitting time to the aperture opening speed becomes far larger than the value in the flashmatic method, the changing amount of the aperture size gets to be such a large value that it is not negligible. As a result, obtaining a correct exposure is no longer ensured. For this reason, the external flash control method has to be used under the condition that the size of opening of the diaphragm aperture does not change during the flash emission. So, it is desirable to adopt a fixed aperture flash emitting method in which the size of aperture opening is kept constant during the flash emission.

The simplest way the fixing of the aperture size during the flash emission is assured is to make the diaphragm, for example, fully open when the flash device is emitting flash light. That is to say, a full-open aperture flash emitting method may be considered to be used.

FIG. 6(a) and 6(b) shows time relationships between the aperture value and the flash emission when the flash device emits flash light with the diaphragm at full open aperture, as described above. In FIG. 6(a), the abscissa represents time and the ordinate represents the aperture size (the size of opening of the shutter). The diaphragm takes a time To to move from the fully closed state to the fully open state. The flash device then emits flash light for a time Tst as in FIG. 6(b). Then, the diaphragm closes in a time Tc. This running characteristic of the shutter blades reveals that in the case shown by a line "a" in FIG. 6(a), the hatched areas give a surplus exposure amount by which the actual exposure is greater than the correct one for flash photography. Hence, the use of this full-open aperture flash emitting method, however, gives rise to a problem that at the time of daylight photography with fill-in flash used for correcting the backlighting, an over exposure by the amount defined by the hatched areas results. Even at night, flash photography suffers a similar problem of deteriorating the picture quality because, as the above-described hatched areas increase, the dark current in the CCD increases.

So, to solve the above-described problem, a countermeasure must be taken by (i) increasing the running speed of the shutter blades (diaphragm blades) to decrease the exposure with the light other than that necessary for photography, or (ii) choosing an aperture value other than the full open one to which the shutter or diaphragm is set during the flash emission by using any control means.

For the countermeasure (i) described above, the shutter blades get a running characteristic represented by a line "b" in FIG. 6(a) where the relationship between the aperture and the flash emission is shown.

For the countermeasure (ii) described above, the relationship between the aperture and the flash emission is shown in FIGS. 7(a) and 7(b).

But, to put the countermeasure (i) into practice, (in other words, to increase the running speed of the shutter blades), the power of the motor or the like must be increased, or the electric current supplied to that motor must be increased. The increase of the motor capacity or the increase of the current supplied to the motor, however, leads to an increase of the size of the camera or the like and an increase of its production cost. Moreover, the consumption of the battery and the running cost are increased. Hence, the countermeasure (i) is not feasible.

Also, to realize the countermeasure (ii), for example, (a) a mechanical method of fixing the aperture size by inserting a round diaphragm of appropriate aperture size into the optical path when making a flash exposure, or (b) an electrical method of fixing the aperture size by decelerating the motor as the drive source for the shutter blades (diaphragm blades) when the blades have reached a near position to a predetermined terminal end of movement so that the motor can stop just at that predetermined terminal end, may be considered. But, the method (a) has a drawback that the mechanical structure becomes complicated, which leads to a large increase of the size of the shutter mechanism. Hence, it is not the advantageous one.

Meanwhile, the other method (b) is ideal as the flash exposure control method for the camera using the semi-open type shutter. But, as far as the conventional semi-open type shutter is concerned, the aforesaid method (b) has not been feasible, because the shutter blades are arranged to run at a constant speed regardless of where the shutter blades are stopped (in other words, independently of the size of the opening of the shutter which is set as the target).

FIG. 8 shows running characteristic curves of the shutter blades. In FIG. 8, running speeds of the shutter blades are represented by the inclinations (gradients) of the running characteristic curves A-C. In the case of the running characteristic curve A, the shutter blades runs at a speed $V_A$; in the case of the running characteristic curve B, at a speed $V_B$; and in the case of the running characteristic curve C, at a speed $V_C$. Incidentally, in FIG. 8, the abscissa represents time t and the ordinate the size of opening of the shutter in F-number.

As shown in FIG. 8, to assure that the shutter blades stop in a position for a predetermined aperture size Fx, the speed of the shutter blades must have the value $V_A$. If it takes the faster value $V_B$, the shutter blades overrun the aperture size Fx. As the position the shutter blades have to stop in approaches smaller aperture sizes, the running speed of the shutter blades must be slowed down. Otherwise, it would become impossible to stop the shutter blades in the prescribed position. Yet, conversely, if the speed of the shutter blades is slow while the position the shutter blades have to stop in nears the full open aperture, more light amount than necessary is used to effect exposing. Therefore, the above-described phenomenon, that the dark current of the CCD increases to deteriorate the picture quality, takes place.

SUMMARY OF THE INVENTION

One aspect of this invention is to realize establishment of an aperture value that is obtained by calculation based on a guide number of the flash device and a measured value of the object distance when the flash device emits flash light. For this purpose, driving of the shutter is made variable in speed as a function of the calculated aperture value. Thus an over-exposure or under-exposure is prevented from occuring. This leads to no possibility of deteriorating the picture quality.

BRIEF DESCRIPTION OF THE DRAWINGS

FIG. 5(a) and 5(b) are graphs illustrating the relationships between the shutter blade running characteristic at the time of flash photography by the device of the invention and the flash emission.

FIG. 6(a) and 6(b) are graphs illustrating the time relationship between the aperture value and the flash emission in the flash control method of fully opening the diaphragm at the flash light emitting time in the camera having the publicly known flash control device of the external flash control type.

FIG. 7(a) and 7(b) are graphs illustrating the time relationship between the aperture value and the flash emission in a flash control method of setting the aperture size to a value Fa other than that for the full open aperture during the flash emission.

FIG. 8 is a graph of the running characteristics of the shutter blades with variation of the speed of the shutter blades.

DETAILED DESCRIPTION OF THE PREFERRED EMBODIMENTS

The present invention is next described in connection with an embodiment thereof by reference to the drawings.

Figure 4A:
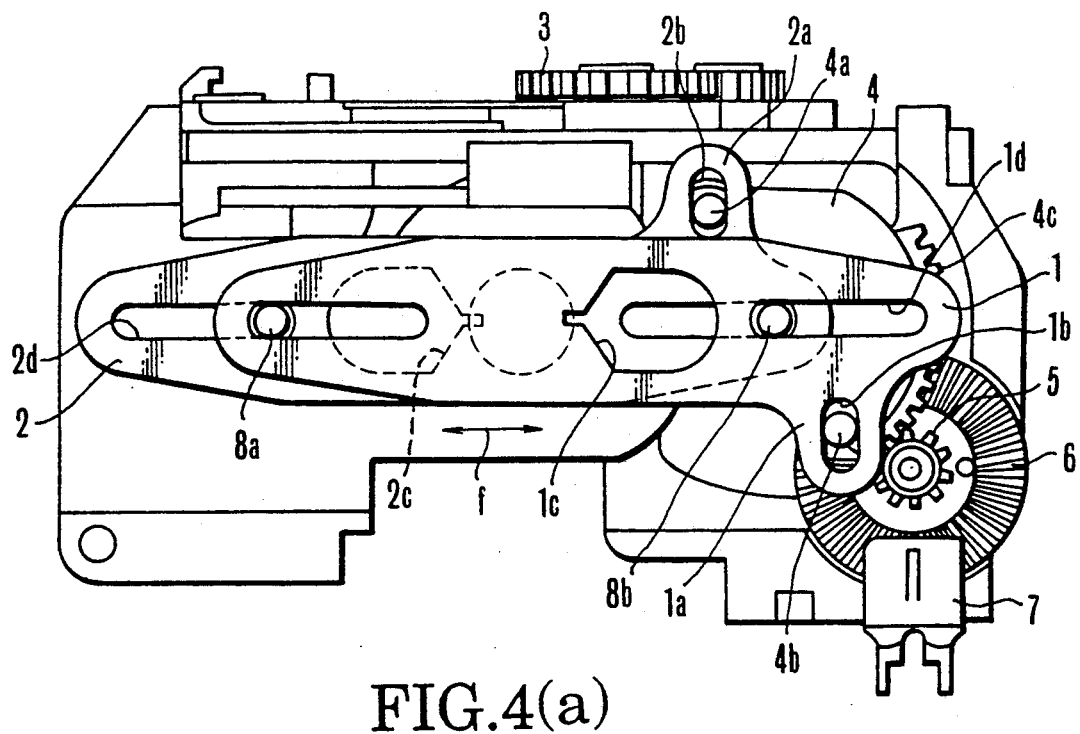
FIG. 4(a) and FIG. 4(b) are front elevation views of the mechanical structure of the shutter portion of the electronic still camera.
Figure 4B:
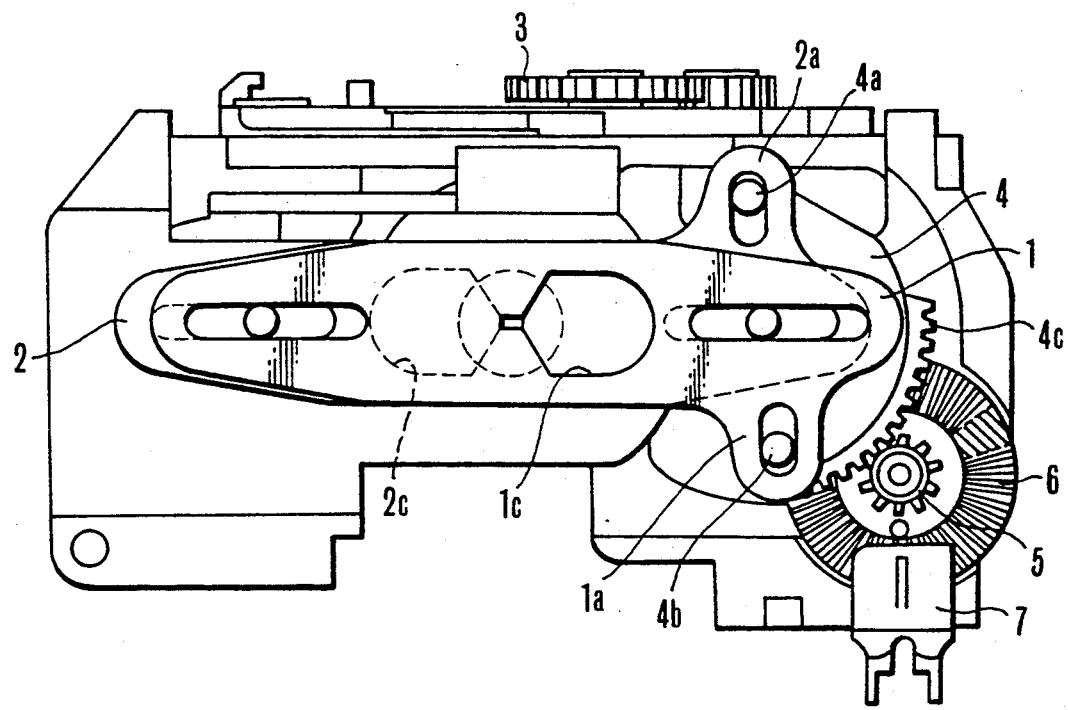

FIGS. 4(a) and 4(b) show the structure of a semi-open type shutter for the electronic still camera employing the flash photography control device of the invention. In FIGS. 4(a) and 4(b), two shutter blades 1 and 2 move in directions indicated by arrow f. A gear 3 is rotated by an electric motor (not shown). A shutter plate 4 rotates around an axis perpendicular to the paper in FIGS. 4(a) and 4(b). The shutter plate 4 has teeth 4c formed therein to mesh with a rack member (not shown). The rack member is in mesh with the gear 3. Thus, the shutter plate 4 is driven by the motor. A pair of pins 4a and 4b project perpendicular to the shutter plate 4 in symmetry with respect to the axis, the pin 4b being inserted into a slot 1b bored in an extension 1a of the shutter blade 1 in slidable relation to each other, and the pin 4a being inserted into a slot 2b bored in an extension 2a of the shutter blade 2 in slidable relation to each other.

A gear 5 is in mesh with the teeth 4c of the shutter plate 4 so that it is driven to rotate by the shutter plate 4. A pulse sheet (or encoder) 6 is mounted on the edge of the gear 5. A photo-interpreter 7 generates an electrical signal in the form of pulses corresponding to the passed transparent portions in the pulse sheet 6 thereacross. Fixed guide pins 8a and 8b are inserted into linearly elongated slots 1d and 2d of the shutter blades 1 and 2 respectively to guide and support the shutter blades 1 and 2 in such a way as to move in horizontal directions as viewed in FIGS. 4(a) and 4(b). Diaphragm apertures 1c and 2c are bored in the shutter blades 1 and 2 respectively to form a shutter opening of variable size.

Incidentally, FIG. 4(a) shows the shutter in the fully closed state, and FIG. 4(b) shows the shutter opened to a small aperture.

The mechanical structure of the semi-open type shutter shown in FIGS. 4(a) and 4(b) is known to those skilled in the art. So, this structure does not constitute that feature of the flash photography control device which is characteristic of the invention. But, since the semi-open type shutter has some correlation with the flash photography control device of the invention, its operation is briefly described below.

When the motor (not shown) rotates, the rack member (not shown) is driven by the gear 3 to move linearly. The shutter plate 4 in mesh with the rack member is being rotated in a clockwise direction as viewed in FIG. 4(a). Then, the pin 4a of the shutter plate 4 moves to the right as viewed in FIG. 4(a), while the other pin 4b moves to the left. Therefore, the shutter blades 1 and 2 are moved to the left and right respectively. Hence, the shutter changes from the fully closed state of FIG. 4(a) to an opening state for a small aperture of FIG. 4(b). Meanwhile, because the shutter plate 4 is rotated, the gear 5 in mesh with the teeth 4c of the shutter plate 4 is rotated. The pulse sheet 6 fixedly mounted on the gear 5 goes moving past the photo-interpreter 7, or across the path between its light projecting element and its light receiving element. Each time one transparent stripe of the pulse sheet 6 passes, an electrical pulse signal is produced. As that pulse signal is counted by a pulse counter (not shown), the speed and ever changing positions of the shutter blades are electrically detected.

And, as the aforesaid motor is driving the shutter blades 1 and 2 in the opening direction, when the size of opening of the shutter has reached a predetermined value, the motor is stopped. This is followed by emission of flash light. At the end of the emission, the motor is reversely rotated and, at the same time, the shutter blades 1 and 2 are returned to the fully closed state of FIG. 4(a) by the motor or a spring (not shown).

Incidentally, the aforesaid motor is controlled by a drive means to be described later, which is located in the flash photography control device of the invention.

Referring to FIG. 1 through FIGS. 3(a) and 3(b), the outline of the structure and the control operation of an electronic still camera employing the flash photography control device of the invention are described.

Figure 1:
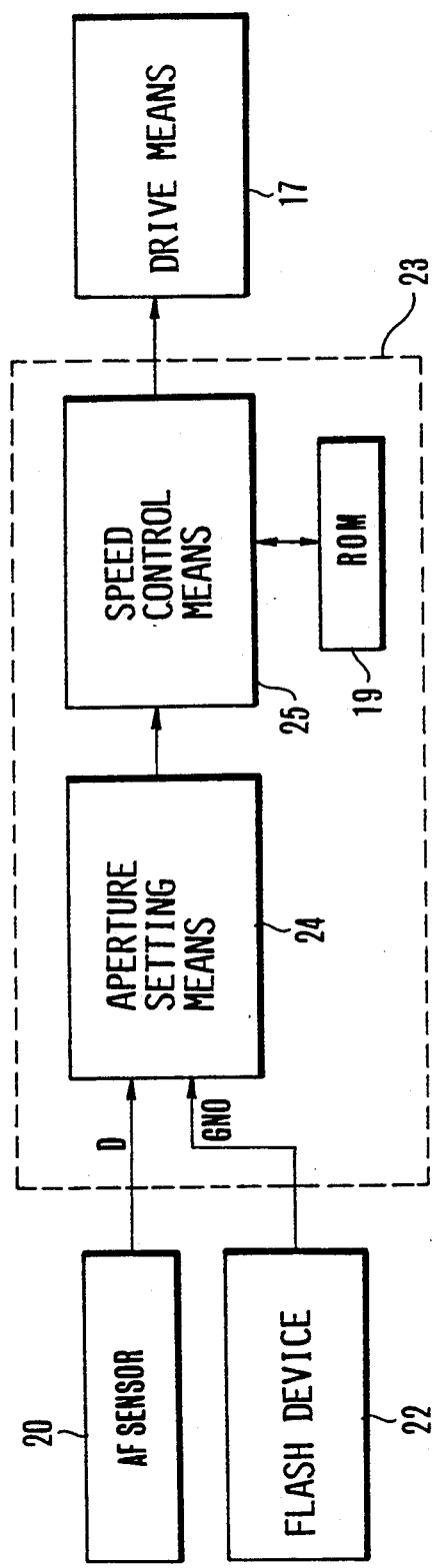
FIG. 1 is a schematic diagram of the essential structure of a flash photography control device with the main parts of a camera according to the invention.
Figure 2:
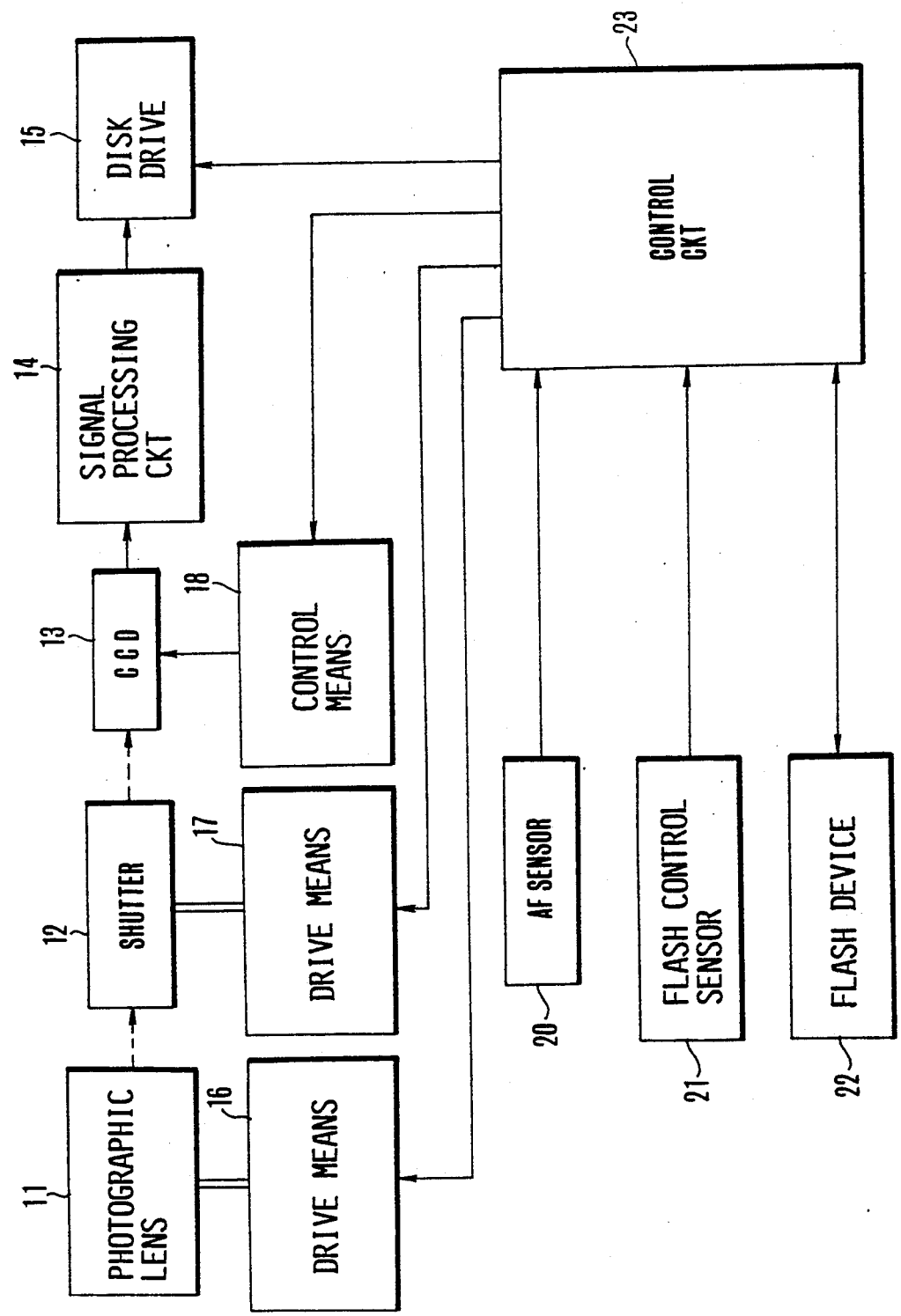
FIG. 2 is a diagram roughly illustrating the construction of an electronic still camera having the flash photography control device shown in FIG. 1.

FIG. 1 is a diagram of an arrangement of the main constituent parts of the electronic still camera shown in FIG. 2 which coordinate with the flash photography control device of the invention.

Incidentally, in FIG. 2, dashed lines represent the light beams, doubled solid lines represent the mechanical transmission systems, and single solid lines represent flows of electrical signals.

In FIG. 2, a light beam is passed through a photographic lens 11, after its intensity is regulated by a diaphragm-cum-shutter 12, the light beam enters a CCD 13 where it is photoelectrically converted. The output of the CCD 13 is processed according to a prescribed format by a signal processing circuit 14, and then recorded on a magnetic disk or like recording medium in a disk drive 15.

Focusing of the photographic lens 11 is adjusted in such a manner that the output of an AF sensor 20, i.e., information representing the measured object distance, is taken in a control circuit 23 including a microcomputer, the required amount of movement of a focusing lens is computed, and the focusing lens is moved by a drive means 16.

Within the control circuit 23, there are provided the essential parts of the flash photography control device of the invention, namely, not only an aperture setting means 24 and a speed control means 2, but also a ROM 19 serving as means for storing a speed control program.

In flash photography, on receipt of the amount of flash light available from a flash device 22, i.e., the guide number, and the output of the AF sensor 20, i.e., the measured value of the distance, the aperture setting means 24 computes an aperture value to be used with emission of flash light. The speed control means 25 then controls the speed of the shutter blade drive motor so that the shutter blades get such a speed that the computed aperture value can be established during the flash emission. The shutter blade drive motor is included in another drive means 17 (FIG. 2), and that motor is controlled by the speed control means 25 in the control circuit 23.

Figure 3A:
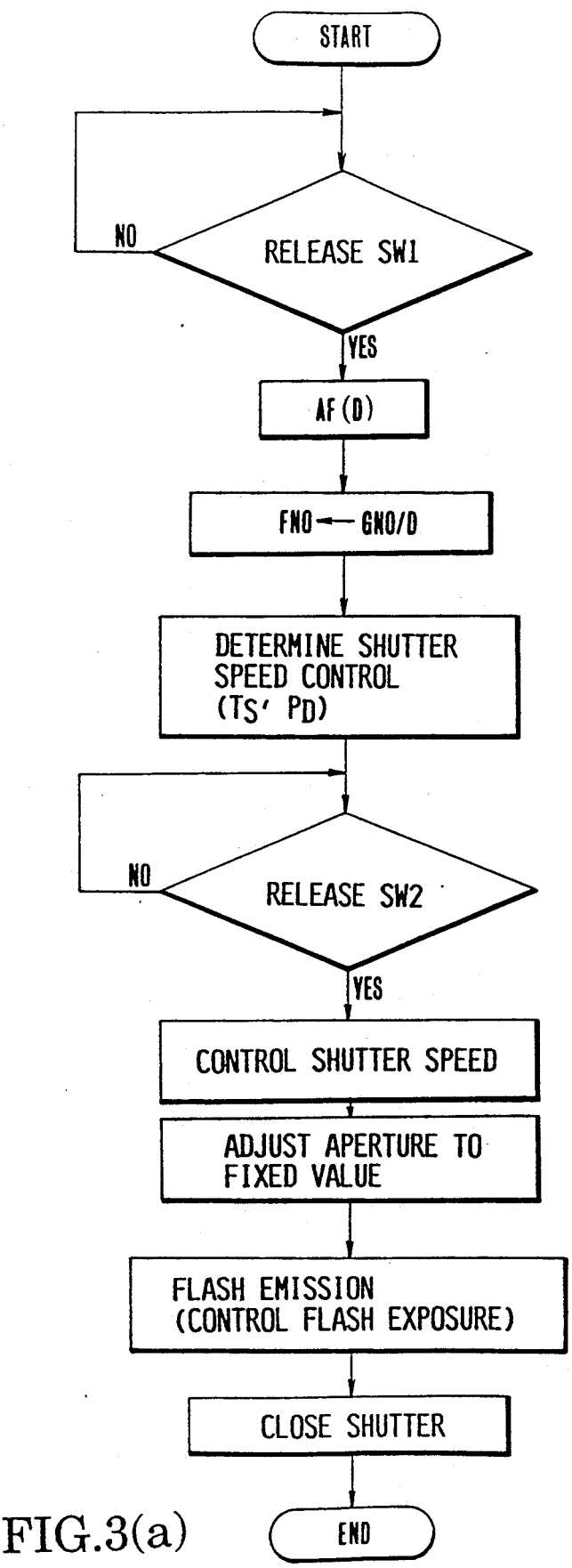
FIG. 3(a) is a flowchart for control operations which are executed in the flash photography control device of the invention.

FIG. 3(a) is a flowchart for control operations at the time of flash photography of the camera of FIG. 2 employing the flash photography control device of the invention.

Figure 3B:
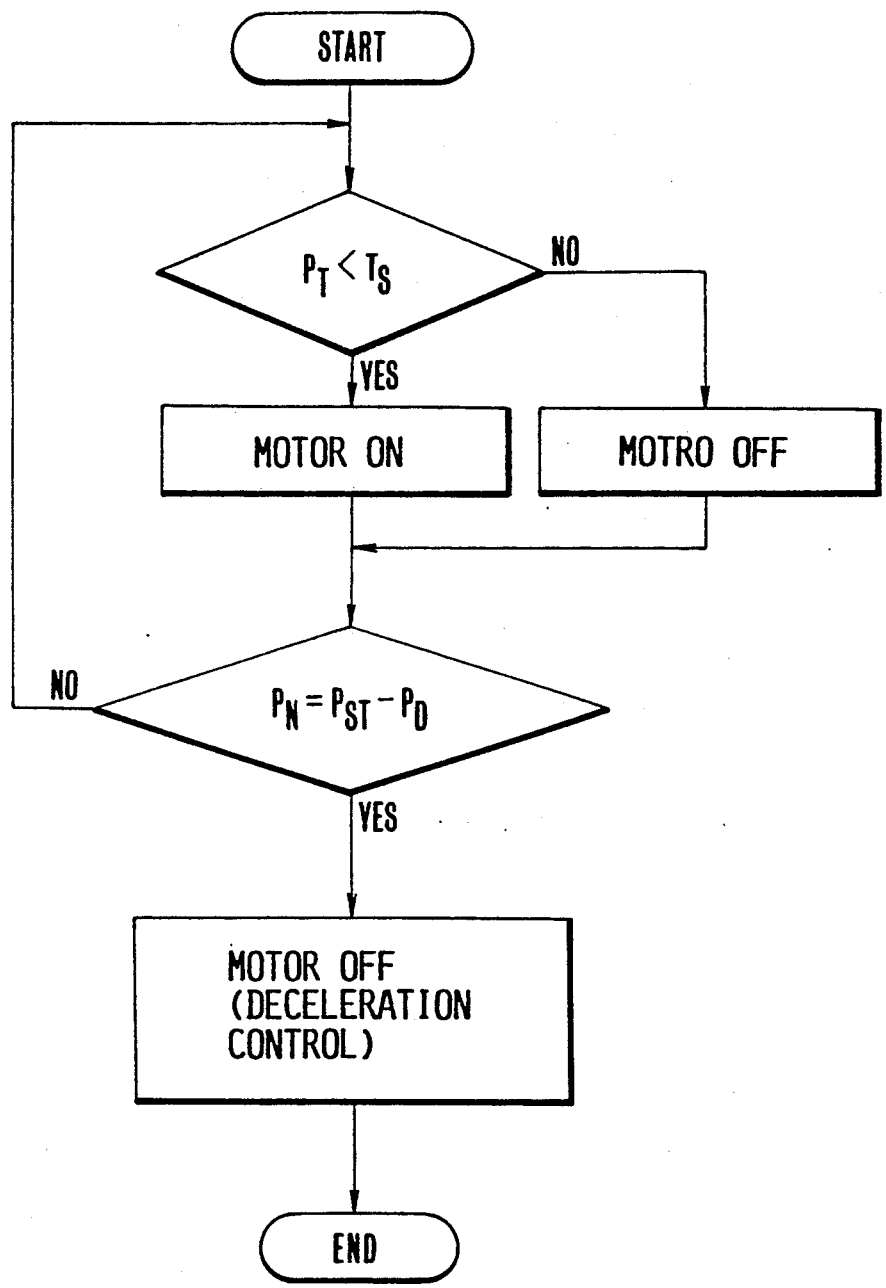
FIG. 3(b) is a flowchart for a speed control operation which is executed in the shutter blade drive motor control means in the flash photography control device of the invention.

FIG. 3(b) is a flowchart for a speed control operation by the speed control means 25 and ROM 19 shown in FIG. 1.

Referring next to FIG. 3(b), a method of controlling the speed by controlling the on and off operation of the shutter blade drive motor is described.

To control the power supply to the motor, the number of pulses $P_T$ per a predetermined time unit read by the photo-interpreter 7 is first compared with the speed constant $T_S$ corresponding to the aperture value previously computed based on the guide number and the measured value of the object distance. In the event of $P_T < T_S$, that is, when the motor speed is below a set value of the speed, the motor is then left ON, being permitted to accelerate. In the event of $P_T \geq T_S$, the motor is then turned off. The use of such a scheme for the control operation makes it possible to simplify the speed control. Further, from a point of time at which a number of pulses smaller than the number of pulses $P_{ST}$ from the initial value corresponding to the predetermined aperture size by a predetermined number of pulses $P_D$ have been counted up onward, a deceleration control of the motor is carried out in order to insure that the shutter blades stop at the position corresponding to the predetermined aperture value.

It should be noted that the parameters $T_S$ and $P_D$ of the speed control of the shutter blades each are set to an optimum value depending on the set aperture value.

FIGS. 5(a) and 5(b) show a manner of this control operation.

Fc, Fb and Fa represent the sizes of opening of the shutter at which the shutter blades are to be stopped, where Fc>Fb>Fa. Line curves labeled a, b and c show the relationships between the opening characteristic and the flash timing. As will be understandable from the graph, of FIG. 5(a) the nearer the position in which the shutter blades have to stop to the minimum aperture size, the slower the running of the shutter blades is made, with an advantage of increasing the accuracy of stop position control of the blades. Conversely, the nearer the stop position of the shutter blades to the full open aperture, the faster the running speed of the shutter blades is made, with an advantage of minimizing the amount of light which does not contribute to a direct illumination with flash light so that, in flash photography, the picture quality is prevented from deteriorating by an over exposure and dark current.

As has been described above, the flash photography control device according to the present embodiment is constructed in such a way that the speed of the shutter blade drive motor is made variable and this variation is controlled in accordance with the present aperture value to insure that the aperture value set at the beginning on the basis of the measured value of the object distance can be realized during the flash emission. Therefore, the accuracy with which shutter blades stop to set the aperture value for flash photography can be greatly increased. As a result, there is no possibility of inviting an over or under exposure in flash photography. Particularly in application of the device of the present embodiment to the electronic still camera, the exposure is improved at the time of flash photography.

What is claimed is:

1. A camera comprising:
   (a) a shutter which also serves as a diaphragm;
   (b) a flash device;
   (c) a distance measuring device;
   (d) setting means for setting a size of opening of said shutter for flash photography on the basis of measured distance information obtained from said distance measuring device and a guide number of said flash device, said setting means retaining said size of opening of said shutter under the condition that said flash device is emitting flash light; and
   (e) control means for varying the opening speed of said shutter according to said size of opening of said shutter set by said setting means.

2. A camera according to claim 1, wherein said shutter is driven in an opening direction by a motor serving as a drive source.

3. A camera according to claim 2, wherein said control means varies the speed of rotation of said motor for said shutter.

4. A camera according to claim 1, wherein said control means controls said opening speed in such a manner that as said size of opening of said shutter set by said setting means increases, said opening speed increases.

5. A camera according to claim 1, further comprising: a photographic conversion element for receiving light coming from an object to be photographed and having passed through the opening of said shutter.

6. A camera according to claim 5, wherein said control means controls said opening speed in such a manner that as said size of opening of said shutter set by said setting means increases, said opening speed increases.

7. A camera according to claim 1, wherein said setting means includes a control circuit for setting said size of opening of said shutter.

8. A camera according to claim 1, wherein said control means includes a control circuit for controlling the opening speed of said shutter.

9. A camera according to claim 1, wherein said setting means detects movement of a member which moves in association with an opening operation of said shutter by using an encoder, and stops the opening operation of said shutter at a time when a predetermined size of opening has been obtained.

10. A camera according to claim 2, wherein said setting means detects movement of a member which moves in association with an opening operation of said shutter by using an encoder, and stops the driving of said motor for said shutter at a time when a predetermined size of opening has been obtained.

11. A camera according to claim 8, wherein information on the opening speed of said shutter is obtained from information stored in a memory in said control circuit.

12. A camera comprising:
    (a) a shutter which also serves as a diaphragm;
    (b) a flash device;
    (c) setting means for setting a size of opening of said shutter for flash photography, said setting means retaining said size of opening of said shutter under the condition that said flash device is emitting flash light; and
    (d) control means for varying the opening speed of said shutter according to said size of opening of said shutter set by said setting means.

13. A camera according to claim 12, wherein said shutter is driven in an opening direction by a motor serving as a drive source.

14. A camera according to claim 13, wherein said control means varies the speed of rotation of said motor for said shutter.

15. A camera according to claim 12, wherein said control means controls said opening speed in such a manner that as said size of opening of said shutter set by said setting means increases, said opening speed increases.

16. A camera according to claim 12, further comprising: a photoelectric conversion element for receiving light coming from an object to be photographed and having passed through the opening of said shutter.

17. A camera according to claim 16, wherein said control means controls said opening speed in such a manner that as said size of opening of said shutter set by said setting means increases, said opening speed increases.

18. A camera according to claim 12, wherein said setting means includes a control circuit for setting said size of opening of said shutter.

19. A camera according to claim 12, wherein said control means includes a control circuit for controlling the opening speed of said shutter.

20. A camera according to claim 12, wherein said setting means detects movement of a member which moves in association with an opening operation of said shutter by using an encoder, and stops the opening operation of said shutter at a time when a predetermined size of opening has been obtained.

21. A camera according to claim 13, wherein said setting means detects movement of a member which moves in association with an opening operation of said shutter by using an encoder, and stops the driving of said motor for said shutter at a time when a predetermined size of opening has been obtained.

22. A camera according to claim 19, wherein information on the opening speed of said shutter is obtained from information stored in a memory in said control circuit.

23. A camera capable of emitting flash light, comprising:
    (a) a shutter which also serves as a diaphragm;
    (b) setting means for setting a size of opening of said shutter for flash photography, said setting means retaining said size of opening of said shutter under the condition that flash light is emitted; and (c) control means for varying the opening speed of said shutter according to said size of opening of said shutter set by said setting means.

24. A camera according to claim 23, wherein said shutter is driven in an opening direction by a motor serving as a drive source.

25. A camera according to claim 24, wherein said control means varies the speed of rotation of said motor for said shutter.

26. A camera according to claim 23, wherein said control means controls said opening speed in such a manner that as said size of opening of said shutter set by said setting means increases, said opening speed increases.

27. A camera according to claim 23, further comprising: a photoelectric conversion element for receiving light coming from an object to be photographed and having passed through the opening of said shutter.

28. A camera according to claim 27, wherein said control means controls said opening speed in such a manner that as said size of opening of said shutter set by said setting means increases, said opening speed increases.

29. A camera according to claim 23, wherein said setting means includes a control circuit for setting said size of opening of said shutter.

30. A camera according to claim 23, wherein said control means includes a control circuit for controlling the opening speed of said shutter.

31. A camera according to claim 23, wherein aid setting means detects movement of a member which moves in association with an opening operation of said shutter by using an encoder, and stops the opening operation of said shutter at a time when a predetermined size of opening has been obtained.

32. A camera according to claim 24, wherein said setting means detects movement of a member which moves in association with an opening operation of said shutter by using an encoder, and stops the driving of said motor for said shutter at a time when a predetermined size of opening has been obtained.

33. A camera according to claim 30, wherein information on the opening speed of said shutter is obtained from information stored in a memory in said control circuit.

* * * * *